Patented July 23, 1929.

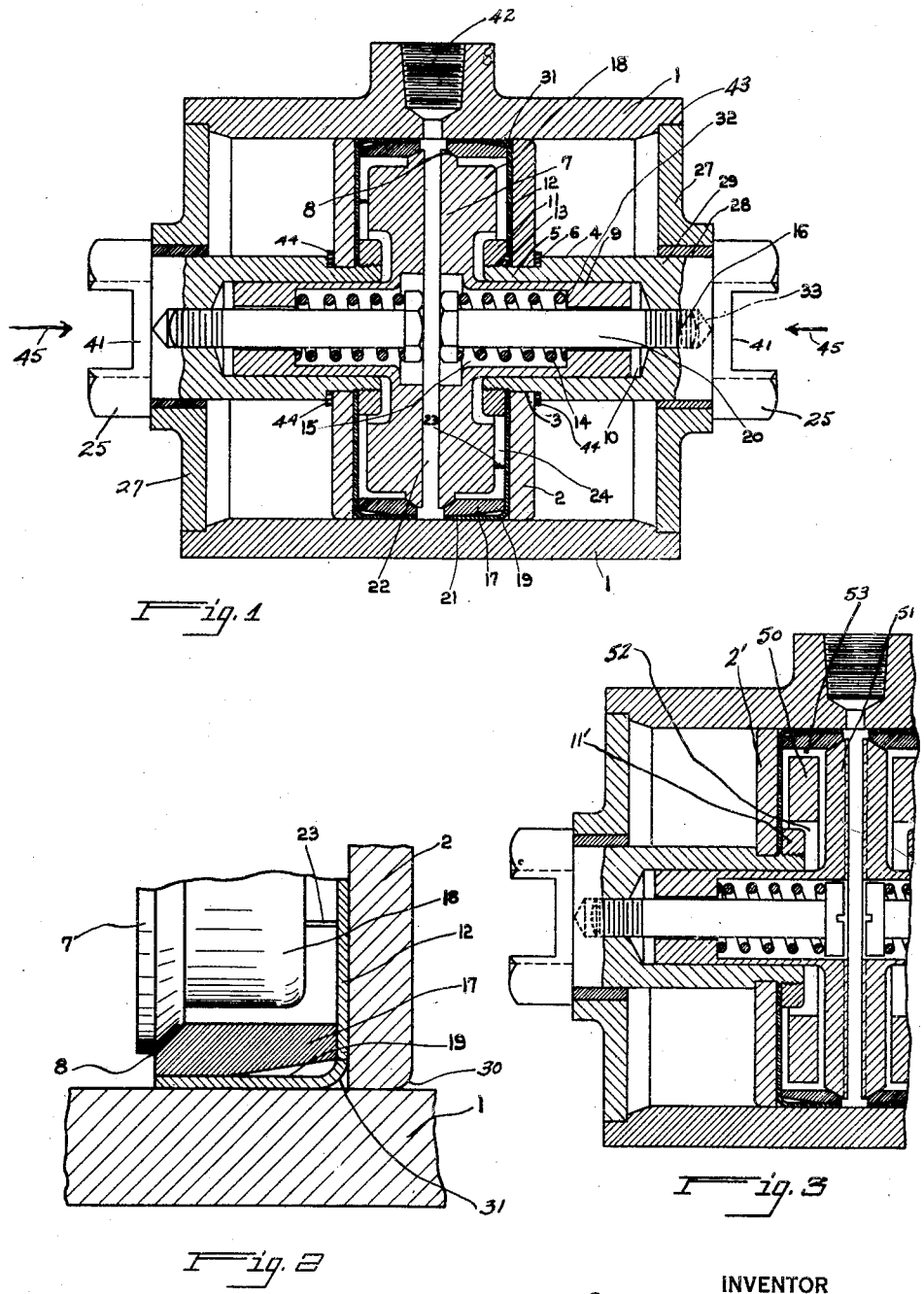

1,721,986

UNITED STATES PATENT OFFICE.

NIELS A. CHRISTENSEN, OF CLEVELAND, OHIO.

PISTON.

Application filed July 15, 1926. Serial No. 122,597.

My invention relates to pistons and relates more particularly to pistons adaptable for use in fluid compressors, pumps, fluid operated brakes, rams, and the like, although my invention is not confined to such a use.

An object of my invention is to provide an improved form of piston wherein an efficient seal may be had between the walls of the cylinder, wherein the piston reciprocates, and the piston head, and in which the parts comprising the piston may be readily assembled.

Another object of my invention is to provide a piston of the fluid pressure seal type wherein little wear will occur between the sealing parts of the piston and the cylinder wall.

Another object of my invention is to provide a piston of this type which will not effect an undue amount of friction between the piston and the cylinder walls.

Another object of my invention is to provide a piston which can be readily, inexpensively manufactured and assembled and when assembled may be placed in a cylinder of proper bore dimensions and will operate efficiently in connection with such cylinder.

Other objects of my invention and the invention itself will become apparent by reference to the following description of embodiments of my invention, illustrated in the accompanying drawings, forming a part of this specification.

Referring to the drawings:—

Fig. 1 shows a longitudinal medial sectional view of an embodiment of my invention, certain portions, however, being shown in elevation therein;

Fig. 2 shows a fragment of the piston of Fig. 1, the view being mostly in section; and Fig. 3 is a view of a fragment of a piston and cylinder, mostly in longitudinal medial section, the view being of a modification of the embodiment illustrated in Fig. 1.

Referring first to Figs. 1 and 2, at 1, I show the walls of a cylinder in which the piston of my invention is illustrated as having been placed for reciprocation therein; and at 2, I show the body of the piston having a centrally disposed opening 3 adapted to be inserted over the reduced end 5 of a tubular stem 4 and abut against a shoulder 6 formed thereon.

At 7, I show a relatively movable piston head of poppet valve form having a disk head portion beveled at 8 at its intraperipheral lower edge portion, an integral thickened backing 18, and comprising also an integral tubular stem 9 depending axially from the disk head 7 and projected within the bore 10 of the tubular piston stem 4. Nut 11 is threaded onto the reduced end 5 of the stem 4. A metallic cup 12 seated on the upper surface of the piston body is centrally perforated to admit the reduced end of the stem 4, and is clamped by the nut 11 which is screwed against the top surface of the piston body 2, which adjoins the axial bore thereof. A compression spring 14, disposed in the bore 15, is compressed between the shoulder 32 of the lower enlarged end of the stem 9 and the head of a bolt 20, the threaded end 16 being screw threaded into the axial threaded recess 33 of the stem 4. An expansion ring 17 is placed within the side walls 19 of the cup 12, portions of the outer surfaces of which contact with the inner surfaces of cylinder walls 1, the ring 17 being substantially annular and preferably having a diagonal slit 23 at some point in its length.

In inserting the ring 17 into the cup 19, the ring is contracted to bring the opposing surfaces along the slit more closely together against the resiliency of the ring material. When the ring is in place, it tends to expand and maintains, therefore, a pressure tending to expand the side walls 21 of the cup. This action is increased, moreover, by the camming action exerted by the beveled surface 8 of the piston head 7 under the influence of the compressed spring 14. In addition to the above two sources of pressure, which constantly tend to expand the cup side walls, this action is increased variably according to the variable amount of pressure exerted by the pressure of fluid contained in the cylinder chamber 22 and which exerts a pressure upon the entire upper surface of the piston head 7, and this pressure likewise is communicated by the camming action of the beveled surface 8 and the expansible ring 17 to the cup side walls.

Fluid pressure will be communicated, restrictedly, through the slit 23 of the ring 17 to the chamber 24 to the rear of the piston head. The slit 23 also provides a passage for the equalization of pressures in 24 and 22 upon a diminution of pressure in the cylinder chamber 22, whereupon in such cases fluid under greater pressure will pass between the walls of the slit 19 to the cylinder chamber.

This will permit the parts to be more quickly restored to a position wherein the cup walls are not so tightly contacted with the cylinder side walls, during the period following a period of high pressure in the cylinder chamber.

The volume of the fluid containing space 24, between the piston head and piston body is reduced by projecting portion such as 18 of the piston head, as illustrated in Fig. 1, and as the annular ring 50 illustrated in Fig. 3; thus less fluid under pressure is required to be used than if the space 24 were of larger volumetric content.

Pressures cannot escape from the chamber 24 to the space to the rear of the piston head nor to atmosphere past the stem 4. A gasket 44 is provided between the shoulder 6 of the stem 4 and the disk-shaped head 2 to prevent leakage of fluid under pressure.

It will be noted that I have provided a working contact element 25, forming an integral head for the tubular stem 4, the retractile effort of the operated mechanism being exerted against each of the elements 25 to retract the pistons after movement thereof by fluid pressure.

The ends of the cylinder are preferably closed by disks 27, each seated within an annular recess 43 concentric with the bored boss 26 of the disk central portion. The recess 43 is co-axial with the inner walls of the cylinder, so that the piston may be prevented from cocking, which would unduly increase the friction had with the side walls.

A bearing liner of relatively non-frictional material is shown at 28 between the piston stem and the tubular surface 29 of an opening through the end wall 27 receiving the piston stem.

The cup side walls 31 are of relatively thin metallic material and continuous throughout their peripheral length, being sufficiently resilient that when expanded by the camming effect of the fluid pressed piston head 7 acting through the ring 17 to make tight sealing contact with the inner walls of the cylinder 1 and the pressure being thereafter relieved, the pressure of contact had with the cylinder walls will be reduced, thus reducing the resultant friction. The composite piston, therefore, may be more readily restored to normal position, as illustrated, by the retractile force of the operated mechanism acting in the direction of the arrows 45. The ring 17 will distribute the expanding pressure over a considerable portion of the cup side walls and by relieving the ring 17 in portions thereof, particularly adjacent the bottom wall 12 of the cup, such pressure may be limited to a given peripheral portion of the cup side walls, such as the portion more nearly adjacent the rim of the cup, as illustrated. The angle of bevel 8 determines to a considerable extent whether the maximum pressure will be exerted more nearly towards the rim of the cup or relatively more remote therefrom.

In practice, the side walls of the cup, which are forced into contact with the cylinder side walls in a manner above described, effect an efficient seal against the escape of fluid under pressure from the chamber 22; a relatively large sealing surface contacting with the cylinder side walls and the pressure per unit of contact area is reduced, effecting a reduction in frictional wear.

In Fig. 3, I have illustrated an embodiment of my invention wherein an annular ring 50 of preferably light impervious material such as aluminum, rubber, bakelite, or the like, is inserted within the space 24, being substituted for the portion 18 of the first described embodiment, and the head 51 in this embodiment, being made relatively thin. The remainder of the piston and associated parts are similar in construction to the piston 7 of the embodiment of Fig. 1. The annular ring is centrally apertured at 52 and so disposed in the space 53 between the piston head and piston body that the aperture receives the nut 11'.

Momentum in the piston head 51 is reduced by virtue of decreasing the weight of the same.

Having thus described my invention in specific embodiments, I am aware that numerous and extensive departures may be made from the embodiments herein illustrated and described but without departing from the spirit of my invention.

I claim:

1. In a composite piston, the combination with a piston stem having an axial recess extending from an end and supporting a disk flange at such end, an apertured cup seated on the disk flange and having a side wall disposed adjacent the wall of a cylinder in which the piston is adapted to operate, a camming element of approximately mushroom valve form having an axially recessed stem, and a head flange, the end wall of the last named recess being apertured, the camming element having an intraperipheral beveled edge portion adapted to effect a camming expansion effort upon the side wall of the cup to press the same against the cylinder walls, a bolt having a threaded end passed through the aperture in the said apertured end wall and secured to the end wall of the recessed piston stem, and a compression spring interposed between the head of the bolt and the recessed end wall of the camming element stem, the outer surface of the camming element head flange being exposed to fluid pressure within the cylinder, the effect of such fluid pressure and of the compression spring being aggregated to effect expansion of the cup side wall, and an annular ring interposed between the opposing faces of the camming element and cup end wall to reduce the fluid content of the space therebetween.

2. In a composite piston, the combination with a piston stem having an axial recess extending from an end and supporting a disk flange at such end, an apertured cup seated on the disk flange and having a side wall disposed adjacent the wall of a cylinder in which the piston is adapted to operate, a camming element of approximately mushroom valve form having an axially recessed stem, and a head flange, the end wall of the last named recess being apertured, the camming element having an intraperipheral beveled edge portion adapted to effect a camming expansion effort upon the side wall of the cup to press the same against the cylinder wall, a bolt having a threaded end passed through the aperture in the said apertured end wall and secured to the end wall of the recessed piston stem, and a compression spring interposed between the head of the bolt and the recessed end wall of the camming element stem, the outer surface of the camming element head flange being exposed to fluid pressure within the cylinder, the effect of such fluid pressure and of the compression spring being aggregated to effect expansion of the cup side wall, and an annular ring interposed between the opposing faces of the camming element and cup end wall to reduce the fluid content of the space therebetween, said piston stem and supported disk being removably secured together.

3. In a composite piston, the combination with a piston stem having an axial recess extending from an end and supporting a disk flange at such end, an apertured cup seated on the disk flange and having a side wall disposed adjacent the wall of a cylinder in which the piston is adapted to operate, a camming element of approximately mushroom valve form having an axially recessed stem, and a head flange, the end wall of the last named recess being apertured, the camming element having an intraperipheral beveled edge portion adapted to effect a camming expansion effort upon the side wall of the cup to press the same against the cylinder wall, a bolt having a threaded end passed through the aperture in the said apertured end wall and secured to the end wall of the recessed piston stem, and a compression spring interposed between the head of the bolt and the recessed end wall of the camming element stem, the outer surface of the camming element head flange being exposed to fluid pressure within the cylinder, the effect of such fluid pressure and of the compression spring being aggregated to effect expansion of the cup side wall, and an annular ring interposed between the opposing faces of the camming element and cup end wall to reduce the fluid content of the space therebetween, a ring interposed between the said beveled surface of the camming element and the cup side wall, and adapted to be expanded to communicate an expansive effort exerted by the element to the side wall of the cup.

4. In a composite piston, the combination with a piston stem having an axial recess extending from an end and supporting a disk flange at such end, an apertured cup seated on the disk flange and having a side wall disposed adjacent the wall of a cylinder in which the piston is adapted to operate, a camming element of approximately mushroom valve form having an axially recessed stem, and a head flange, the end wall of the last named recess being apertured, the camming element having an intra-peripheral beveled edge portion adapted to effect a camming expansion effort upon the side wall of the cup to press the same against the cylinder wall, a bolt having a threaded end passed through the aperture in the said apertured end wall and secured to the end wall of the recessed piston stem, and a compression spring interposed between the head of the bolt and the recessed end wall of the camming element stem, the outer surface of the camming element head flange being exposed to fluid pressure within the cylinder, the effect of such fluid pressure and of the compression spring being aggregated to effect expansion of the cup side wall, and an annular ring interposed between the opposing faces of the camming element and cup end wall to reduce the fluid content of the space therebetween, the piston stem adapted to communicate motion between the piston and a mechanism operating in connection therewith and responsive to a retractive effort of such mechanism, upon a release of fluid pressure in the cylinder above the piston, to restore the piston to normal position, the material of the cup side wall being sufficiently resilient to contract upon the relief of such fluid pressure and to thereby reduce the frictional pressure had between the cup side wall and the walls of the cylinder when outwardly cammed thereagainst.

In testimony whereof I hereunto affix my signature this 16th day of June, 1926.

NIELS A. CHRISTENSEN.